J. L. CREVELING.
ELECTRIC REGULATION.
APPLICATION FILED DEC. 1, 1919. RENEWED MAY 31, 1922.
1,437,132.                                           Patented Nov. 28, 1922.
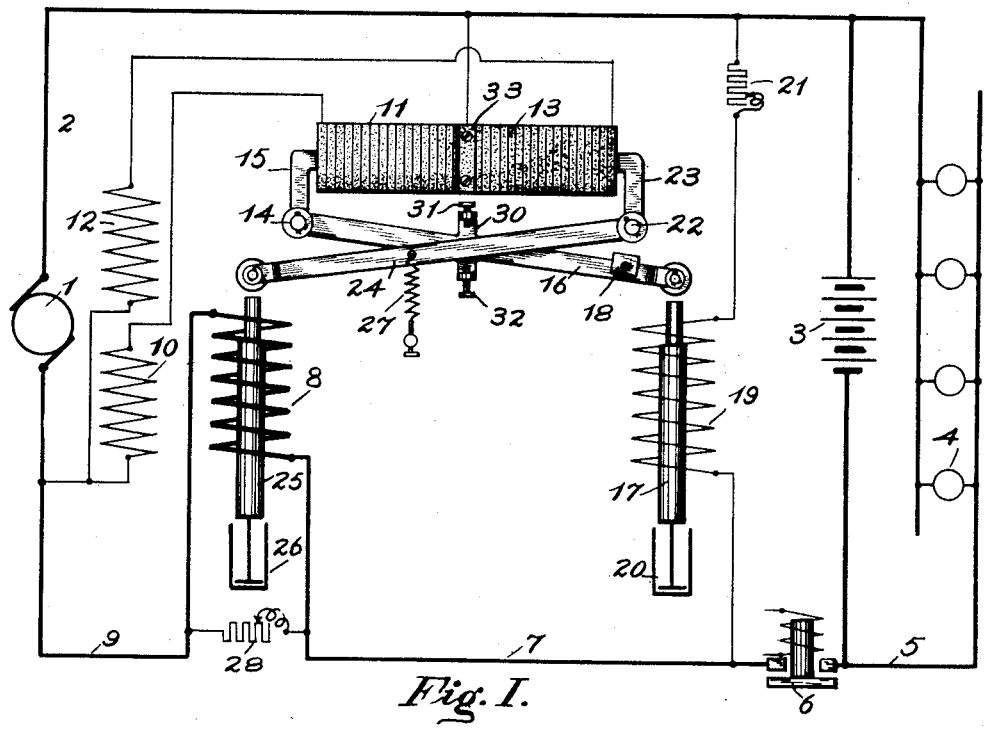
Fig. I.
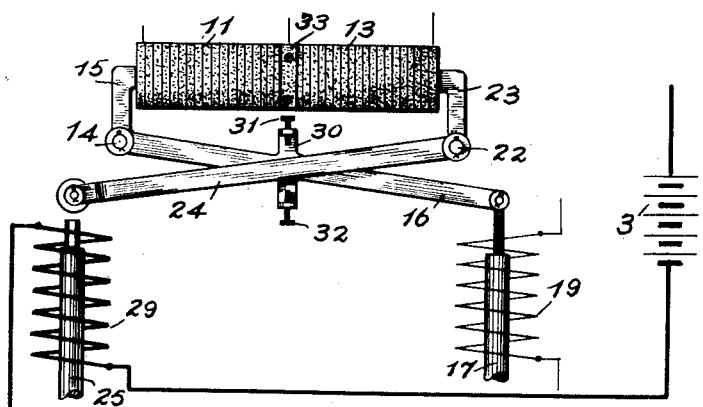
Fig. II.
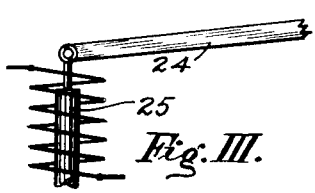
Fig. III.
INVENTOR
John L. Creveling Patented Nov. 28, 1922.

1,437,132

UNITED STATES PATENT OFFICE.

JOHN L. CREVELING, OF TUCSON, ARIZONA, ASSIGNOR TO GOULD COUPLER COMPANY, A CORPORATION OF NEW YORK.

ELECTRIC REGULATION.

Application filed December 1, 1919, Serial No. 341,707. Renewed May 31, 1922. Serial No. 564,853.

*To all whom it may concern:*

Be it known that I, JOHN L. CREVELING, a citizen of the United States, residing at Tucson, county of Pima, and State of Arizona, have invented certain new and useful Improvements in Electric Regulation, of which the following is a description.

My invention pertains to that class of electric regulation wherein it is desired to automatically regulate a generator, and has for a particular object to provide means whereby the same will be efficiently accomplished.

My invention is particularly applicable to systems wherein a dynamo or generator is used to charge a storage battery and operate lamps or other translating devices and wherein it is desired to limit the current in a circuit supplied by the generator, or the voltage across a circuit supplied by the generator throughout wide changes in speed, and it will therefore be described with reference to such a system, as such systems are now well known and usually employed in the art of car lighting.

This application is a continuation, to the extent that common subject-matter is disclosed, of my application for improvement in electric regulation, filed November 1, 1916, Serial No. 128,824.

Fig. I is a diagrammatic representation of a system illustrating one embodiment of my invention;

Fig. II is a diagrammatic representation illustrating certain modifications which may be made in the system of Fig. I; and Fig. III illustrates a modification which may be made in either the system of Fig. I or in the modification shown in Fig. II.

In the drawing, 1 represents a dynamo or generator having the positive lead 2 in communication with the positive terminals of the storage battery 3 and lamps or other translating devices 4. The storage battery and translating devices have their negative terminals connected by lead 5 with one side of a suitable switch 6, the opposite side of which is connected as by lead 7 with one end of the solenoid or winding 8, the opposite end of which is connected as by wire 9 with the negative side of the generator 1. The generator is provided with a field coil 10, indicated as a shunt coil, having in series therewith a controllable resistance 11, indicated as of the carbon pile variety, for the purpose of illustration. The generator is also provided with a shunt field coil 12 having in series therewith a controllable resistance 13, also indicated for example as of the carbon pile type. It will therefore be obvious that manipulation of the pressure upon the carbon piles 11 and 13, by varying the resistance thereof, will affect the field of the generator. A very convenient arrangement of the carbon piles is to place them in line, as shown in the drawing, with a common connection to lead 2, through the stationary conducting member or block 33.

The stud or pivot 14 carries a bell-crank lever composed of the short arm 15 and the long arm 16. The free extremity of the arm 16 has under it a movable core of iron or other magnetic material indicated at 17, and is normally drawn in a downward direction as by the adjustable weight 18 which tends to increase the pressure upon the pile 11. 19 is a coil across the circuit whose voltage it is desired to prevent from exceeding a predetermined limit, and in this instance is indicated as across the generator circuit and therefore responsive to fluctuations in generator voltage and influenced by the battery voltage when the battery is charging. When energized, the coil 19 tends to lift the core 17 and decrease the pressure upon the pile 11 and increase the resistance thereof; while too sudden movement is prevented by the dashpot mechanism indicated at 20. 21 is a variable resistance which may be used for adjusting the operation of coil 19. 22 is a pivot or stud carrying the bell-crank lever comprising the short arm 23 and the long arm 24. The arm 24 has under its free extremity a core of iron or other magnetic material indicated at 25 which is adapted to engage and lift the said arm. 25 is surrounded by the coil 8 in such manner that the said coil when energized tends to raise the core 25 against the action of the dash-pot arrangement 26, and, by lifting lever 24, decrease the pressure upon the pile 13 and increase the resistance thereof. 27 is an adjustable spring normally tending to draw the lever 24 downwardly and increase the pressure upon the pile 13. I have shown the lever 24 as having an adjustable spring 27 and the lever 16 as having an adjustable weight 18, to indicate that these are mere equivalents, and it will be obvious that either lever may have a spring, a weight, or both, as desired. 28 is an adjustable resistance in shunt across the coil 8 whereby the operation of the said coil may be adjusted. 30 is a yoke carried by lever 16 and provided with adjustable screws 31 and 32 adapted to engage lever 24 when either of the levers 16 or 24 is sufficiently moved, for a purpose to be pointed out.

In Fig. II like numerals are used to indicate like parts, and the only modifications intended to be brought out by this figure reside in the coil 29, which is shown in series with the storage battery and which may be substituted in place of the coil 8 of Fig. I, which is in series with the generator; and a pivotal connection of core 17 with lever 16.

In Fig. III the core 25 is shown as pivotally connected with the lever 24, as distinguished from the separately movable core of Figs. I and II.

The switch 6 may be of any suitable type, and I prefer to use one of the usual automatic switches which will close its circuit when the voltage of the generator is substantially equal to that of the storage battery and open the circuit when the generator voltage falls very slightly below that of the battery, in such manner as to prevent back discharge from the battery through the generator. As these switches are well known in the art and the particular type used forms no part of my present invention, details are purposely omitted for the sake of brevity.

An operation of my invention is substantially as follows:

If the generator be at rest or running at sufficiently low speed, switch 6 will be open and the translating devices may be supplied by the storage battery 3 in a well known manner. If the generator have its voltage brought to slightly in excess of that of the storage battery, switch 6 will close and current will flow from the generator through lead 2 to the storage battery 3 and lamps or other translating devices 4, from which return is made through wire 5, switch 6, lead 7, coil 8 and lead 9 to the generator. A portion of the current, if desired, may, of course, be diverted from coil 8 by means of the adjustable shunt 28. And I so adjust shunt 28 and spring 27 that when the maximum desired current is reached in the coil 8, any further tendency to increase, as for example upon increases in speed of the generator, will cause coil 8 to lift the core 25 smoothly against the action of dashpot 26 and spring 27, so as to lessen the pressure upon the pile 13 and increase the resistance thereof to cut down the field current in the coil 12 and thereby tend to hold this maximum desired current from being exceeded. If the current fall below the normal, the reverse operation will take place, tending to restore the same to the normal value.

I so adjust the resistance 21 and the weight 18 that in case the voltage across the circuit measured by the coil 19 tends to increase above the predetermined desired limit, the said coil will raise core 17 evenly against the action of dashpot 20 and weight 18, in such manner as to raise lever 16 and increase the resistance of the pile 11 and cut down the excitation of coil 10 and tend to prevent this desired maximum voltage from being exceeded. If increase in resistance of the pile 11 to the desired maximum amount will not serve to hold the voltage from exceeding the desired limit, I so adjust the screw 32 that at this point it will come in contact with the lever 24, and then coil 19 will, by further lifting its core 17, raise lever 24 and affect resistance 13 and cut down the current in the field coil 12, and in this manner hold the maximum voltage from being exceeded throughout any increase in speed of the generator that may be met. And I so adjust the screw 31 that, if at any time during the operation of the system, coil 8, by inserting a desired maximum resistance through the instrumentality of pile 13, be unable to hold the maximum desired current from being exceeded, the lever 24 will contact with the screw 31; and then coil 8, by lifting lever 16 and affecting pile 11, will be able to hold the maximum desired current from being exceeded as it will control the total energization of the field.

It will be noted that under most conditions of operation my invention effects a considerable reduction of the heat to be dissipated by the regulating device over a system wherein the generator is controlled by manipulation of a resistance controlling the exciting current in a single field coil or series of coils wherein the resistance manipulated is always in series and carrying the total current to the field. For, throughout a great portion of the operation, sufficient regulation for ordinary speed changes may be made by one of the regulating elements of my invention, and no appreciable heat loss will take place in the other. And, at any such time that both regulating elements are affecting the field to weaken it, one will have practically broken its field circuit or cut its current down so small that the heat loss may be neglected, while the regulation will, in effect, be performed by the other regulating element, which at most need not carry more than half of the maximum field energizing current.

If the coil 29 of Fig. II be substituted for the coil 8 in the system of Fig. I, the operation will be as above described, with the exception that the current in the battery circuit will be limited instead of the current in the main generator circuit.

It will be noted that, if in the operation of the system as above described the lever 16 be raised until the screw 32 affects the lever 24, the said lever 24 may be raised without any opposition from the core 25 notwithstanding the current in the coil 8 may decrease even to allow the core 25 to descend to the position shown in the drawing; and also that if the lever 24 be raised until the contact is made with 31, further elevation of the lever 24 may move lever 16 without in any way being impeded by the core 17 even though the voltage be decreased until the said core returns to its lowest position, as indicated in the drawing. This is due to the fact that the levers 24 and 16 are mechanically disconnected frim the cores 25 and 17 so as to allow a free upward movement of the levers at any stage of operation. In ordinary practice, this arrangement is usually preferable. However, under certain conditions, it may be desirable to connect the core 17 pivotally with the lever 16, as indicated in Fig. II. In that event, raising of the core 24 after it meets the screw 31 will necessitate raising tne core 17, and the action of core 25 will then be somewhat influenced by variations in voltage in the coil 19, which effect is desirable under certain conditions. Furthermore, under other conditions of of operation, it is desirable that core 25, whether responsive to a coil such as 8, or a coil such as 29, shall be pivotally connected to the lever 24, as indicated in Fig. III, in which event the upward movement of the lever 24, due to contact with the screw 32, will be affected and modified by the current in the coil surrounding the core 25, in a manner which may be desired for certain uses to which my invention is applicable.

It is therefore within the scope of my invention to have both cores separate from the levers, as shown in Fig. I; or the voltage core permanently connected and the current core detached, as shown in Fig. II; or the current core attached as shown in Fig. III with the voltage core detached as shown in Fig. I; or the voltage core attached as shown in Fig. II.

I do not wish in any way to limit myself to any of the exact constructions or details of operation given above to illustrate certain embodiments of my invention, for it will be obvious that wide departure may be made without departing from the spirit and scope thereof.

What I claim is:

1. The combination with a generator provided with a plurality of field exciting means, of means for separately affecting a plurality thereof, and means whereby each affecting means may affect another affecting means.

2. The combination with a generator provided with a plurality of field exciting means, of means for separately affecting a plurality thereof, and means whereby a plurality of affecting means may each affect another affecting means.

3. The combination with a generator provided with a plurality of field exciting means, of means for separately affecting a plurality thereof, and means whereby each affecting means may affect another affecting means to cooperate therewith.

4. The combination with a generator provided with a plurality of field exciting means, of means for separately affecting a plurality thereof, and means whereby a plurality of affecting means may each affect another affecting means to cooperate therewith.

5. The combination with a generator having a plurality of field affecting means, of a plurality of regulating means for independently affecting the field affecting means, and means whereby a plurality of said affecting means may each affect the other to cooperate in affecting the generator.

6. The combination with a generator provided with a plurality of field exciting means, of a plurality of regulators affecting a plurality of said means and responsive to a plurality of functions of operation of said generator, and means whereby a plurality of said regulators may cooperate in response to a plurality of functions of the generator's operation.

7. The combination with a generator provided with a plurality of field exciting means, of a plurality of regulators affecting a plurality of said means and responsive to a plurality of functions of operation of said generator, and means whereby a plurality of said regulators may cooperate in response to a plurality of functions of the generator's operation to regulate the generator.

8. The combination with a generator provided with a plurality of field exciting means, of a regulator for affecting one of said exciting means responsive to voltage fluctuations, a regulator for affecting another of said field exciting means responsive to current fluctuations, and means whereby said regulators cooperate to affect the generator in response to both voltage and current fluctuations.

9. The combination with a generator provided with a plurality of field exciting means, of a regulator for affecting certain of said exciting means responsive to voltage fluctuations, a regulator for affecting other of said field exciting means responsive to current fluctuations, and means whereby said regulators cooperate to regulate the generator in response to both voltage and current fluctuations.

10. The combination with a generator provided with a plurality of field exciting means and a storage battery charged thereby, of a regulator for affecting one of said exciting means responsive to voltage fluctuations across the battery, a regulator for affecting another of said field exciting means responsive to current fluctuations, and means whereby said regulators cooperate to affect the generator in response to both voltage and current fluctuations.

11. The combination with a generator provided with a plurality of field exciting means and a storage battery charged thereby, of a regulator for affecting one of said exciting means responsive to voltage fluctuations, a regulator for affecting another of said field exciting means responsive to fluctuations in current supplied to the battery, and means whereby said regulators cooperate to affect the generator in response to both voltage and current fluctuations.

12. The combination with a generator, a regulator therefor responsive to voltage fluctuations and a regulator therefor responsive to current fluctuations, of means whereby each of said regulators affects the other regulator to extend the range of its own regulating function.

13. The combination with a generator, a regulator therefor responsive to voltage fluctuations and a regulator therefor responsive to current fluctuations, of means whereby each of said regulators when responding to fluctuations in the quantity measured thereby may affect the other regulator to extend the range of effect upon the generator caused by fluctuations in said quantity.

14. The combination with a variable speed dynamo, means for regulating the dynamo in response to voltage fluctuations below a predetermined limit, means for regulating the dynamo in response to current fluctuations below a predetermined limit, and means whereby each regulating means affects the other regulating means to regulate the dynamo for fluctuations tending to take place beyond its limit of regulation alone.

15. The combination with a variable speed dynamo, a storage battery charged thereby, means for regulating the dynamo in response to voltage fluctuations below a predetermined limit, means for regulating the dynamo in response to current fluctuations below a predetermined limit, and means whereby each regulating means affects the other regulating means to regulate the dynamo for fluctuations tending to take place beyond its limit of regulation alone whereby the current and voltage supplied to said battery are held within predetermined limits throughout all speed increases of said dynamo.

16. The combination with a dynamo and a plurality of regulating means independently affecting the same, of means whereby the regulating means cooperate under certain conditions to increase the regulating effect beyond the limit of one of said regulating means, and responsive means for independently operating said regulating means arranged to allow free operation of either regulating means by the other when cooperating therewith.

17. The combination with a dynamo and a plurality of regulating means independently affecting the same, of means whereby the regulating means may cooperate to increase the regulating effect beyond the limit of one of said regulating means, and a plurality of responsive means for independently operating said regulating means comprising detached cores capable of affecting the regulating means and allowing free operation of either regulating means by the other when cooperating therewith.

18. The combination with a variable speed dynamo, of a plurality of regulating devices each capable of affecting the operation thereof, a member affecting one of said devices, a member affecting another of said devices, means whereby the members cooperate to simultaneously affect a plurality of devices when a predetermined limit of individual regulation is reached by each, separately movable detached cores adapted to affect said members when moved in one direction and allow free movement of said members in the same direction by the said cooperating means, a current coil affecting one of said cores and a voltage coil affecting the other core.

19. The combination with a variable speed dynamo, of a plurality of regulating devices each capable of affecting the operation thereof, a member affecting one of said devices, a member affecting another of said devices, means whereby the members cooperate to simultaneously affect a plurality of devices when a predetermined limit of individual regulation is reached by each, separately movable detached cores adapted to affect said members when moved in one direction and allow free movement of said members in the same direction by the said cooperating means, a current coil affecting one of said cores and affected by current delivered by the dynamo, and a voltage coil affecting the other core and affected by voltage changes across a circuit supplied by the dynamo.

20. The combination with a dynamo and a plurality of regulating means independently affecting the same, of means whereby the regulating means cooperate under certain conditions to increase the regulating effect beyond the limit of one of said regulating means, and responsive means for independently operating said regulating means arranged to allow free operation of one regulating means by the other when cooperating therewith.

21. The combination with a dynamo and a plurality of regulating means independently affecting the same, of means whereby the regulating means may cooperate to increase the regulating effect beyond the limit of one of said regulating means, and a plurality of responsive means for independently operating said regulating means comprising a detached core capable of affecting the regulating means and allowing free operation of one regulating means by the other when cooperating therewith.

22. The combination with a generator, a regulator therefor responsive to certain fluctuations and a regulator therefor responsive to other fluctuations, of means whereby each of said regulators affects the other regulator to extend the range of its own regulating function.

23. The combination with a generator, a regulator therefor responsive to certain fluctuations and a regulator therefor responsive to other fluctuations, of means whereby each of said regulators when responding to fluctuations measured thereby may affect the other regulator to extend the range of effect upon the generator caused by said fluctuations.

24. The combination with a variable speed dynamo, means for regulating the dynamo in response to certain fluctuations below a predetermined limit, means for regulating the dynamo in response to other fluctuations below a predetermined limit, and means whereby each regulating means affects the other regulating means to regulate the dynamo for fluctuations tending to take place beyond its limit of regulation alone.

25. The combination with a variable speed dynamo, of a plurality of regulating devices each capable of affecting the operation thereof, a member affecting one of said devices, a member affecting another of said devices, means whereby the members cooperate to simultaneously affect a plurality of the devices when a predetermined limit of individual regulation is reached by one of said devices, separately movable cores adapted by their movement to affect said members, one of said cores being detached from its affected member to allow free movement of said member in one direction by said cooperating means.

26. The combination with a variable speed dynamo, of a plurality of regulating devices each capable of affecting the operation thereof, a member affecting one of said devices, a member affecting another of said devices, means whereby the members cooperate to simultaneously affect a plurality of the devices when a predetermined limit of individual regulation is reached by one of said devices, separately movable cores adapted by their movement to affect said members one of said cores being detached from its affected member to allow free movement of said member in one direction by said cooperating means, and a current coil affecting one of said cores and a voltage coil affecting another core.

JOHN L. CREVELING.